US011234197B2

(12) United States Patent
Tellado et al.

(10) Patent No.: US 11,234,197 B2
(45) Date of Patent: Jan. 25, 2022

(54) PREDICTING POWER STATES OF ACCESS POINTS

(71) Applicant: Hewlett Packard Enterprise Development LP, Houston, TX (US)

(72) Inventors: Jose Tellado, Santa Clara, CA (US); Bernd Bandemer, Santa Clara, CA (US); Alexander Mendez, Santa Clara, CA (US); Hilmi Gunes Kayacik, Santa Clara, CA (US); Charlie Hogg, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 112 days.

(21) Appl. No.: 16/427,840

(22) Filed: May 31, 2019

(65) Prior Publication Data

US 2020/0383064 A1 Dec. 3, 2020

(51) Int. Cl.
*H04W 52/22* (2009.01)
*H04W 88/08* (2009.01)
*H04W 52/02* (2009.01)
*H04B 17/391* (2015.01)
*H04W 24/02* (2009.01)
*H04L 5/00* (2006.01)
*H04W 52/24* (2009.01)

(52) U.S. Cl.
CPC ...... *H04W 52/223* (2013.01); *H04B 17/3913* (2015.01); *H04L 5/0082* (2013.01); *H04W 24/02* (2013.01); *H04W 52/0206* (2013.01); *H04W 52/243* (2013.01); *H04W 88/08* (2013.01); *Y02D 30/70* (2020.08)

(58) Field of Classification Search
CPC ....... H04W 24/02–04; H04W 52/0206; H04W 52/22–228; H04W 52/283–285; H04W 72/0486; Y02D 70/00; Y02D 30/70; H04B 17/3913
See application file for complete search history.

(56) References Cited

U.S. PATENT DOCUMENTS

| | | | |
|---|---|---|---|
| 8,488,484 B2 | 1/2013 | Gobriel et al. | |
| 9,247,495 B2 | 1/2016 | Liu et al. | |
| 9,467,918 B1* | 10/2016 | Kwan | H04W 36/165 |
| 10,588,094 B2* | 3/2020 | Liu | H04W 24/10 |

(Continued)

OTHER PUBLICATIONS

Chiaravalloti, S. et al., Power Consumption of WLAN Network Elements, (Research Paper), Aug. 2011, 31 Pgs.

(Continued)

*Primary Examiner* — Marcus Smith
(74) *Attorney, Agent, or Firm* — Brooks, Cameron & Huebsch, PLLC

(57) ABSTRACT

Example implementations relate to predicting power states of access points (APs). A non-transitory computer readable medium may store instructions executable by a processing resource to: in response to a first client device being associated with a first access point (AP) of a group of APs, determine a first degree of performance a second AP of the group is to provide if the first client device is associated with the second AP; and predict, based on the determined degree of performance, a second degree of performance the group of AP is to provide to a second client device if the second client device is associated with the group of APs during a first time interval at a location.

20 Claims, 6 Drawing Sheets

(56) References Cited

U.S. PATENT DOCUMENTS

| | | | |
|---|---|---|---|
| 2015/0043404 A1* | 2/2015 | Sergeyev | H04L 1/1812 370/311 |
| 2015/0382290 A1* | 12/2015 | Yaacoub | H04W 24/02 370/311 |
| 2016/0366638 A1* | 12/2016 | Kumar | H04W 24/02 |
| 2017/0006483 A1* | 1/2017 | Attanasio | H04L 67/125 |
| 2017/0026888 A1* | 1/2017 | Kwan | H04W 52/0206 |
| 2017/0187595 A1* | 6/2017 | Tinnakornsrisuphap | H04W 88/10 |
| 2018/0213421 A1* | 7/2018 | Horvitz | H04W 16/14 |
| 2019/0261197 A1* | 8/2019 | Bellamkonda | H04W 24/04 |
| 2020/0288392 A1* | 9/2020 | Rao | H04W 24/08 |

OTHER PUBLICATIONS

Jardosh, A. et al., Green WLANs: On-demand WLAN Infrastructures, (Research Paper), Retrieved Sep. 11, 2018, 14 Pgs.

Rocha, H. et al., Wi-Green: Optimization of the Power Consumption of Wi-Fi Networks Sensitive to Traffic Patterns, (Research Paper), 2017, The 2017 International Workshop on Service-oriented Optimization of Green Mobile Networks (GREENNET), Retrieved Sep. 11, 2018, 5 Pgs.

Junk, K et al., Energy Efficient Wifi Tethering on a Smartphone, (Research Paper), Jul. 8, 2014, Published in: IEEE INFOCOM 2014—IEEE conference on Computer Communications 9 Pgs.

Lozano, D. et al., Energy Prediction of Access Points in Wi-Fi Networks According to Users' Behaviour, (Research Paper). Aug. 11, 2017, Applied Science 2017, vol. 7, No. 8, 17 Pgs.

* cited by examiner

PREDICTING POWER STATES OF ACCESS POINTS

BACKGROUND

In some computing networks, access points (APs) may provide network connectivity to client devices. These APs may be associated with controllers. The APs and the controllers may work in coalition to provide redundancy for reliable network connectivity in an event that an AP of the APs and/or a controller of the controllers fails.

DETAILED DESCRIPTION

In a computing network, APs can provide network connectivity to client devices associated with the APs. The APs of the computing network can be assigned to various types of controllers in order to provide network connectivity to client devices associated with the APs of the computing network. The various types of controllers can provide redundancy for network connections of the APs of the computing network. For example, areas of coverage provided by two or more APs may be overlapped to provide continuous network connectivity to the client devices.

A total number of APs located within an area may be increased proportional to a number of client devices and/or a sufficient degree of network connectivity designed to provide to the client devices. Often, the total number of APs to be located within the area may be determined based on a peak number of client devices and/or the sufficient degree of network connectivity. However, the total number of APs determined may not be fully utilized since a demand from a peak number of client devices and/or for a peak degree of network connectivity may not last permanently. Therefore, a portion of the total number of APs may have unnecessary power consumption, for instance, when less than the peak number of client devices are present within the area.

Accordingly, the disclosure is directed to predicting power states of access points. The APs with adjusted power states may reduce unnecessary power consumption and yet provide a sufficient degree of network connectivity to client devices associated with the APs. According to the disclosure, power states of the APs may be adjusted based on a number of factors such as client information of current client devices (e.g., client devices currently associated with the APs), client information of past client devices (e.g., client devices previously associated with the APs), and/or a power model, which may be built based on the client information as mentioned above. Therefore, the disclosure may provide a flexibility in meeting a client demand and/or a power consumption goal, which may be dynamically altered as a number of and/or types of client devices differs from time to time.

Figure 1:
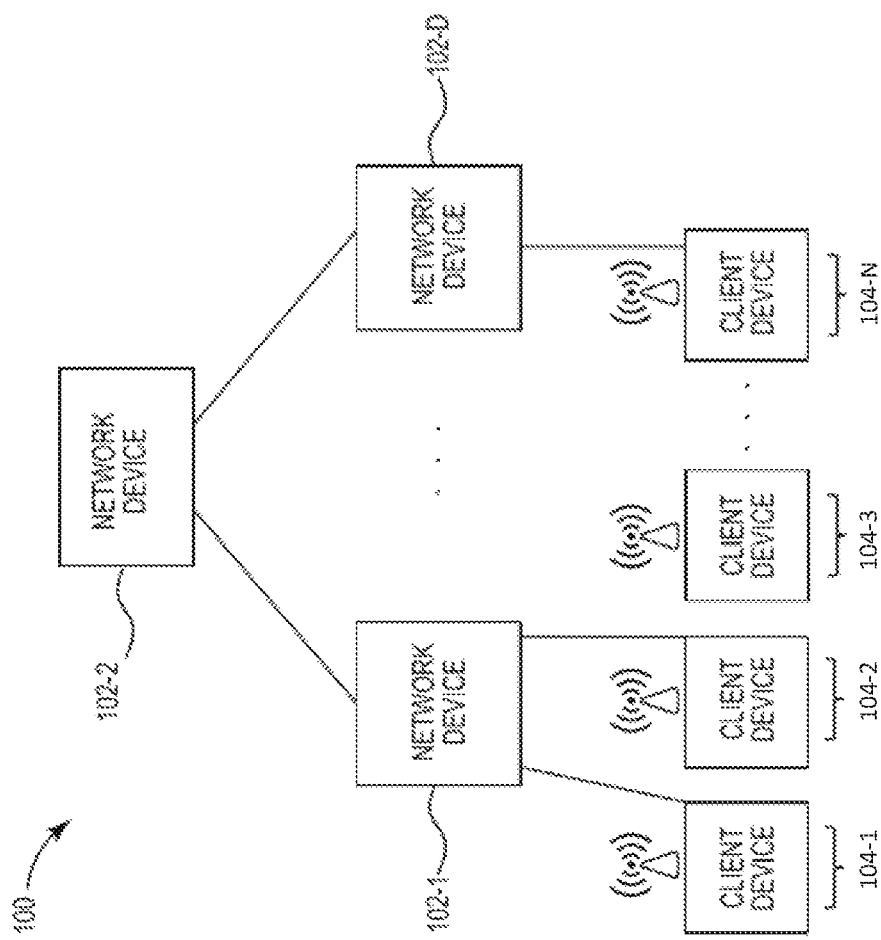
FIG. 1 illustrates an example of a network consistent with the disclosure.

FIG. 1 illustrates an example of a network 100 consistent with the disclosure. As illustrated in FIG. 1, the network layout 100 can include network devices 102-1, 102-2, . . . , 102-D (referred to collectively as network devices 102) and client devices 104-1, 104-2, 104-3, . . . 104-N (referred to collectively as client devices 104). As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, network controllers, etc.) or the like.

In some examples, network devices 102 can include an access point (AP). An AP can refer to a networking device that allows a client device (i.e., a wireless client device) to connect to a wired or wireless network. As used herein, the term "access point" (AP) can, for example, refer to receiving points for any known or convenient wireless access technology which can later become known. Specifically, the term AP is not intended to be limited to IEEE 802.11-based APs. APs function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

A power state of an AP may be adjustable to a number of different power states. For example, a power state of the AP may be adjustable to an active state or a reduced power state. The reduced power state may be one of a sleep state, a standby state, and/or an off state. An AP in an active state may consume more power than in a reduced power state. For example, in an example where the AP has a plurality of transceivers, a greater number of, but not all of, the plurality of transceivers may be used during an active state that in a reduced power state. For example, an AP in an active state may be adjusted to operate with a greater network power (e.g., signal transmission/receipt signal) than in a reduced power state. For example, an AP in an active state may be allocated a different channel and/or more channels than an AP in a reduced power state. For example, an AP in an active state may provide a network connectivity to a client device via a radio corresponding to a higher frequency band (e.g., 5 gigahertz (GHz)) than an AP in a reduced power state (e.g., that provides a network connectivity via a radio corresponding to a frequency band such as 2.4 GHz).

In one example, a power state of an AP may be gradually adjusted. For example, a network power state may be gradually adjusted as the power state of the AP is gradually adjusted. In another example, a power state of an AP may include a plurality of different levels, and the power state of the AP may be sequentially placed from one level to a subsequent level as the power state of the AP is being adjusted.

In some examples, network devices 102 can include a network controller. For example, network device 102-2 can be a network controller while network devices 102-1, . . . , 102-D can be access points, among other possibilities. The network controller can include a processing resource such as a processing resource, memory, and input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. A network controller can include a memory resource, including read-write memory, and a hierarch of persistent memory such as ROM, EPROM, and Flash memory. The network controller 102-2 may include a controller that is a distributed and/or a cloud-based network controller. The network controller can include metrics such as a path-loss among APs (e.g., network devices 102-1, . . . , 102-D), a path-loss between the APs and the client devices 104, distances among the APs, and/or propagation rates among the APs, which can be utilized to determine which is to be powered on. The path loss among the APs and/or between the APs and the client devices 104 can be measured in various ways. For example, the path loss can be an average path loss and/or variance path loss.

As used herein, the term "client device" can, for example, refer to a device including a processing resource, memory, and input/output interfaces for wired and/or wireless communication. For example, the client devices 104 can include a laptop computer, a desktop computer, a mobile device, internet of things (IoT), and/or other wireless devices, although examples of the disclosure are not limited to such devices. A mobile device can, for example, refer to devices that are (or can be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

The network devices 102 and network devices 104 can be connected via a network relationship. As used herein, the term "network relationship" can, for example, refer to a local area network (LAN), a wireless local area network (WLAN), a virtual local area network (VLAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

A combination of network devices 102-1, . . . , 102-D and 102-2 can form a controller cluster that shares client information of the client devices 104 that are associated with, for example, the network devices 102-1, . . . , 102-D. For example, client information of a client device associated with a network device of the network devices 102-1, . . . , 102-D may be shared among the network devices 102-1, . . . , 102-D and the network device 102-2. In some examples, the network device 102-2 may be in charge of a centralized management of the network 100. For example, client information of a client device associated with a network device of the network devices 102-1, . . . , 102-D may be directed to the network device 102-2 such that the client information may be reversely propagated to others of the network devices 102-1, . . . , 102-D.

In some examples, the centralized management that can be provided by the network device 102-2 can include adjusting power states of a group of APs to reduce power consumption of the network devices 102-1, . . . , 102-D and yet providing a sufficient degree of network connectivity to the client devices 104. For example, a first subset of the group of APs can be put into an active state to serve the client devices 104 (e.g., by providing a respective network connectivity to each of the client devices 104) while a second subset of the group of APs can be put into a reduced power state to reduce power consumption of the network devices 102-1, . . . , 102-D. Which APs to include in the first subset or the second subset may be based on client information of client devices currently associated with the group of APs, client information of client devices previously associated with the group of APs, and/or a power model that may be built based on the above-mentioned client information. As an example, the client information that can be used to build the power model can include a number of client devices associated with the group of APs during a particular period, a degree of performance each of the group of APs has provided to a respective one of the client devices, a degree of performance each of the group of APs would have provided, when associated with a respective one of the client devices, a mobility state, a mobility pattern, a roaming pattern, a power state, a network power state, and a client power information of each client device, a feedback received from a client device, or a combination thereof, as described further herein. The terms "mobility pattern" and "mobility information" are used interchangeably herein and can have the same meaning. The term "client power information" can include various power-related information of a client device. As an example, the client power information can include a number of different power states (e.g., reduced power state such as hibernate, sleep, etc.) a client device can be put into, a client power switching pattern of a client device, and/or a power capability of a client device such as whether the client device is a battery-powered device and/or direct current (DC)-powered device. Further details of adjusting the power states based on the above-mentioned factors are described below.

Figure 2:
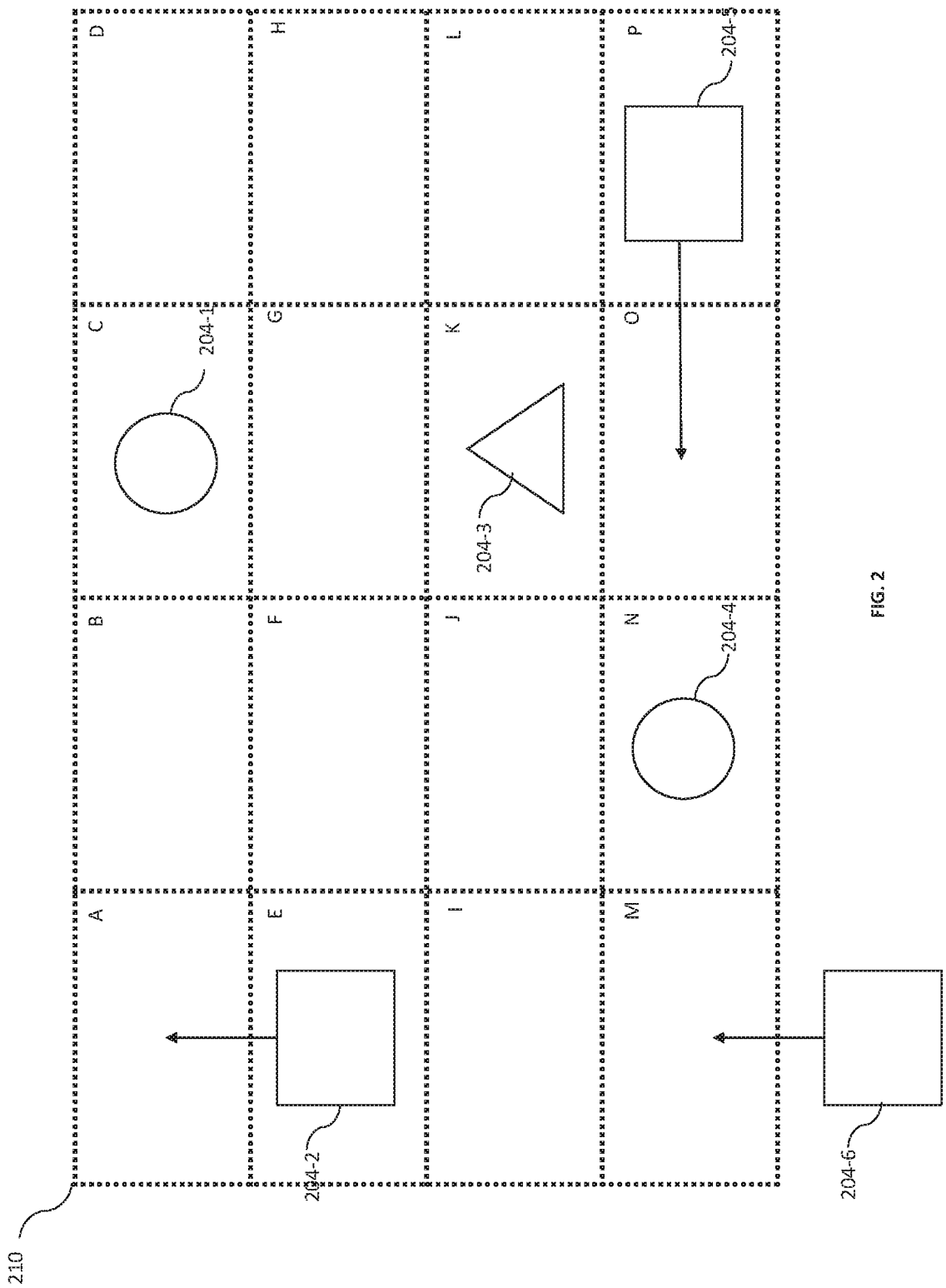
FIG. 2 illustrates client devices present in and/or near an area during a first time interval consistent with the disclosure.

FIG. 2 illustrates client devices 204-1, 204-2, 204-3, 204-4, 204-5, and 204-6 (collectively referred to as client devices 204) present in and/or near an area 210 during a first time interval. The client devices 204 are analogous to those described in connection with FIG. 1 (e.g., client devices 104).

As shown in FIG. 2, the area 210 is separated into a number of sub-areas such as sub-areas A through P as labeled in FIG. 2. A portion of a group of APs (e.g., network devices 102-1, . . . , 102-D described in connection with FIG. 1) may be powered on (e.g., put in to an active state) to provide a respective degree of performance to each of the client devices 204 that are present in a respective sub-area of as well as near the area 210 during the first time interval. As used herein, a degree of performance refers to a degree of network connectivity provided to a client device. For example, the degree of performance may be an indicator of how fast data are being communicated between the client device and an AP the client device is associated with. A degree of performance may be measured based on a performance characteristic of a signal received at an AP from a client device (e.g., a client device of the client devices 204) and/or transmitted from the AP to the client device. For example, the performance characteristic may include a packet latency, a packet retry or drop rate, a data transmission/receipt rate, a signal-to-noise (SNR) ratio, channel state information, or a combination thereof.

As shown in FIG. 2, each of the client devices 204 is located in a respective sub-area at a particular moment during the first time interval. For example, the client device 204-1 is located in the sub-area C, the client device 204-2 is located in the sub-area E, the client device 204-3 is located in the sub-area K, the client device 204-4 is located in the sub-area N, the client device 204-5 is located in the sub-area P, and the client device 204-6 is located outside of the area 210 at the particular moment during the first time interval.

The client devices 204 may be of various client device characteristics. As shown in FIG. 2, the client devices 204-2, 204-5, and 204-6 having a rectangular shape may be of a same client device characteristic, the client devices 204-3 (e.g., and other client devices) having a triangular shape may be of a same client device characteristic, and the client devices 204-1 and 204-4 having a circular shape may be of a same client device characteristic. The client device characteristics may include, for example, an operating system (e.g., Android®, iOS®, Linux®, Windows®, etc.) run by, a client device type (e.g., desktop, laptop, smartphone, and/or IoT, etc.), a network frequency band capability (2.4 GHz, 5 GHz, etc.), a channel list (e.g., including 5 GHz DFS channels) or bandwidth capability (20 MHz, 40 MHz, 80 MHz, 80+80 MHz, 160 Mhz), a total number of transceivers (1×1, 2×2, 4×4, etc.), a wireless communication technique indicating a number of transceivers being simultaneously used (e.g., single-input and single-output (SISO), multiple-input and multiple-output (MIMO), etc.) a wireless specification (e.g., such as those created by the Institute of Electrical and Electronics Engineers (IEEE) LAN/MAN Standards Committee (IEEE 802) provide media access control (MAC) and physical layer (PHY) specifications for implementing wireless local area network (WLAN) computer communication) of the client devices.

Determining which AP to power on to serve the client devices 204 may be based on a power model, which can take into account a number of factors. In some examples, the number of factors can include a degree of performance (e.g., an estimated degree of performance) an AP is to provide to a client device (e.g., of the client devices 204) if the client device is associated with the AP. Stated alternatively, even when a client device has not already been associated with an AP, a degree of performance that would have been provided from the AP to the client device (e.g., had the client device been associated with the AP) can be estimated and utilized for further determining which AP to power on. In some examples, a degree of performance can be estimated based on an interaction between a client device and an AP. As an example, an AP may send a sample packet to a client device (e.g., even when the client device is not associated with the AP) and the estimated degree of performance may be determined based on a performance characteristic of a signal received from the client device in return of the sample packet previously sent. Subsequent to determining the estimated degree of performance, a subset of the group of APs can be selected to serve a plurality of client devices. As used herein, the term "serving" refers to an agreement (by a client device and an AP) to exchange security credentials such as DHCP packets and/or data packets, in addition to exchanging a sample packet.

In some examples, the number of factors can include an end-to-end delay indicating a performance rate of delivering a packet from a client device to a destination. The end-to-end delay can be measured based on an actual degree of performance (e.g., client device to AP propagation delay including a transmission delay, a propagation delay, and/or a processing delay) an AP has provided to a client device that is associated with the AP and/or a degree of performance between two of the group of APs (e.g., AP to AP propagation delay including a transmission delay, a transmission delay, and/or a processing delay). For example, a subset of the group of APs may be pruned (e.g., by being placed into a reduced power state) responsive to determining that a respective degree of performance is less than a performance threshold.

In some examples, the number of factors can include an AP density. As an example, an AP density can indicate a quantity of APs to an area and/or sub-area ratio, and/or a degree of how well wireless propagate through the area and/or the sub-area.

In some examples, the number of factors can include various AP capabilities. As an example, an AP can be capable of communicating with a client device via different network bands (e.g., 2.4 GHz only, 2.4 GHz along with an 5 GHz, and/or 2.4 GHz along with two 5 GHz radios or channels). As an example, an AP can be capable of communicating with a client device via different WiFi generations (e.g., 802.11n, 802.11ac wave1, 802.11ac wave2 with MIMO, and/or 802.11ax with OFDMA). As an example, an AP can be capable of communicating with a client device by utilizing various numbers of transceivers for each radio. As an example, an AP can be capable of communicating with a client device by utilizing different number of transceivers or with internal and/or external antennas (e.g., directional or omnidirectional). As an example, an AP can be capable of communicating with a client device while utilizing different types of power over Ethernet options (PoE), such as 802.11af, 11at, and/or 11bt with different power capabilities, such as 12 watt (W), 25 W, and/or 40 W. In some examples, APs can have various capabilities based on its model, such as whether an AP is an indoor or outdoor model, and/or its power consumption, which may range from 10 W to 40 W.

The number of factors can further include a mobility state, a mobility pattern, a roaming pattern, a power state, a network power state, and a client power switching pattern of each client device, a feedback received from a client device, or a combination thereof, as described further herein. A mobility state of a client device may be determined based on whether the client device is mobile (e.g., moving) or immobile. For example, a mobility state of (e.g., mobile) client devices 204-2, 204-5, and 204-6 may be different than a mobility state of (e.g., immobile) client devices 204-1, 204-3, and 204-4.

A mobility pattern of a client device may be determined based on how the client device moves during a time interval and/or while the client device is being associated with the group of APs and/or is present in the area 210. For example, a mobility pattern of the client device 204-2 may be from a sub-area E to a sub-area A, a mobility pattern of the client device 204-5 may be from a sub-area P to a sub-area O, and a mobility pattern of the client device 204-6 may be from an outside of the area 210 to a sub-area M.

A roaming refers to an event in which a client device switches its association with one AP to another AP. For example, when the associated client device physically moves to a new location that is outside or near the boundary of the coverage of the AP that the client device is associated with, the client device may disassociate with the AP and complete an association handshake process with a different AP that provides a better degree of performance at the new location. Therefore, a roaming pattern can be determined based on a pattern of a number of roamings occurred between the client device and the group of APs. For example, the client device 204-5 may be associated with an AP of the group of APs when the client device 204-5 is located in the sub-area P, and switches to a different AP of the group of APs as it moves to a different sub-area (e.g., sub-area N and/or O) to receive a better degree of performance.

A network power state refers to a state of a transmission/ receipt signal strength of a client device. As an example, a first client device that utilizes a 2.4 GHz frequency band may is in a different network power state than a second client device that utilizes a 5 GHz frequency band. A transmit power is an example of a network power state.

A client power switching pattern refers to a client device's switching pattern among a number of client power states. For example, some client devices may switch from a 2.4 GHz to a 5 GHz for a greater degree of performance, while some client devices may switch from a 5 GHz to a 2.4 GHz to reduce a power consumption (or from 2×2 transceivers to 1×1 to reduce power). As an example, a client device may switch from a 5 GHz to a 2.4 GHz when a power state of the client device falls below a threshold. The terms "network power state" and "transmit power" are interchangeably used herein and can have the same meaning, as appropriate to the context.

In some examples, a client device (e.g., client devices 204) can provide a feedback on a quality of a signal (e.g., degree of performance) received from a respective AP of the APs (e.g., network devices 102-1). The feedback provided by the client device can be utilized to determine which AP to power on to serve the client device. For example, a particular AP whose performance is rated better than other APs by the client device may be powered on to serve the client device. The feedback provided by the client device can be frequency band-specific and/or channel-specific. For example, the feedback provided by the client device can indicate which signal received from a particular AP performs better than others signals at a particular frequency bandwidth and/or channel.

In some examples, the above-mentioned factors may be determined based on various client device characteristics and/or capabilities such as a client device type, an operating system, a network frequency band capability, a total number of transceivers, and/or a wireless specification. These characteristics of client devices (e.g., client devices 204) may be obtained in advance of the client devices 204 being associated with the group of APs and/or based on real-time interaction with the client devices 204. As an example, information associated with those characteristics may be provided from respective client device while being associated with respective APs of the group of APs.

Accordingly, those factors (e.g., client information) including an estimated degree of performance, an actual degree of performance (e.g., a degree of performance an AP has provided to a client device while the client device is associated with the AP), a mobility state, mobility pattern, a roaming pattern, power state, network power state, a client power switching pattern of, and/or a feedback received from the client devices 204 may become basis for adjusting a power state of the group of APs. Stated differently, a power state of the group of APs may be dynamically adjusted based on real-time interaction with the client devices 204. Adjusting a power state of the group of APs can include, for example, determining a first subset of the group of APs and placing the first subset into an active state, while placing a second subset of the group of APs in a reduced power state, which can provide benefits such as saving an overall power consumption of the group of APs.

In some examples, dynamically adjusting a power state of the group of APs based on the real-time interaction with the client devices 204 may be performed locally. For example, real-time interaction with the client device 204-5 may affect a power state of APs present in and/or responsible for the sub-area P, while not affecting a power state of other APs.

In some examples, determining the first subset and the second subset can be based on different modes including, for example, a power saving mode and/or a performance mode. For example, the first subset in a first mode (e.g., coverage mode) provides a minimal degree of performance to each of the client devices 204, while the first subset in a second mode (e.g., capacity mode) provides more than a minimal degree of performance (e.g., desired performance). As such, the first subset in the second mode may include more APs and/or is capable of providing a greater degree of performance than the first subset in the first mode. The first subset in the first mode may be referred to as a coverage group and the first subset in the second mode may be referred to as a capacity group. The different modes may be selectable by a user to determine a tradeoff between a power consumption and a degree of performance of APs.

Changing from the coverage mode to the capacity mode may place more APs into an active state. As such, when more APs are in an active state in the capacity mode, at least a portion of the client devices 204, which were associated with a number of APs during the coverage mode, may be reassigned to a different AP such that the client devices 204 are evenly distributed among the APs that are newly powered on during the capacity mode.

In some examples, a first degree of performance provided (e.g., by powered-on APs) to a first client device (e.g., of the client devices 204) may be different than a second degree of performance provided to a second client device (e.g., of the client devices 204) when the first client device and the second client device have a different mobility state. For example, the client devices 204-2, 204-5, and 204-6 that are mobile may be provided a greater degree of performance than that provided to the client devices 204-1, 204-3, and 204-4 that are immobile.

In some examples, a first degree of performance provided to a first client device may be different than a second degree of performance provided to a second client device when the first client device and the second client device are in a different network power state. For example, the first client device using a 5 GHz may be provided a greater degree of performance than the second client device using a 2.4 GHz. A network power state also may be indirectly determined based on other factors. For example, the first client device having a number of transceivers greater than that of the second client device may be provided a greater degree of performance. As used herein, a "transceiver" refers to a device including both a transmitter and a receiver. As another example, the first client device operating according to a wireless specification using multiple transceivers simultaneously (e.g., MIMO in 802.11n) may be provided a greater degree of performance than the second client device operating according to a wireless specification using an individual transceiver (e.g., SISO in 802.11ac). As another example, the first client device having a greater network frequency band capability (e.g., a client device capable of 5 GHz wireless communication) than that of the second client device (e.g., a client device capable of wireless communication in a frequency band up to 2.4 GHz) may be provided a greater degree of performance.

In some examples, a first degree of performance provided to a first client device may be different than a second degree of performance provided to a second client device when the first client device and the second client device are in different locations. For example, the client devices 204-1, 204-2, 204-3, 204-4, and 204-5 that are located within the area 210 may be provided a greater degree of performance than the client device 240-6 that is located outside of the area 210.

In some examples, a first degree of performance provided to a first client device may be different than a second degree of performance provided to a second client device when the first client device and the second client device have a different device type. For example, the first client device may be a laptop, desktop, and/or a smartphone that are usually capable of 5 GHz wireless communication, while the second client device may be an IoT that is usually capable of a wireless communication up to 2.4 GHz. Accordingly, in this example, the first client device may be assumed to have a greater network frequency band capability and be provided a greater degree of performance than the second client device.

The number of factors (e.g., an estimated degree of performance, an actual degree of performance, a mobility state, mobility pattern, a roaming pattern, power state, network power state, and/or a client power switching pattern of the client devices 204) can also become basis for determining a power model, which may be utilized to predict a degree of performance to be provided to future client devices (e.g., client devices 304 that may be associated with the group of AP during a second time interval). Further details of adjusting power states of the group of APs for future client devices based on the previously determined power model are described in connection with FIG. 3.

Figure 3:
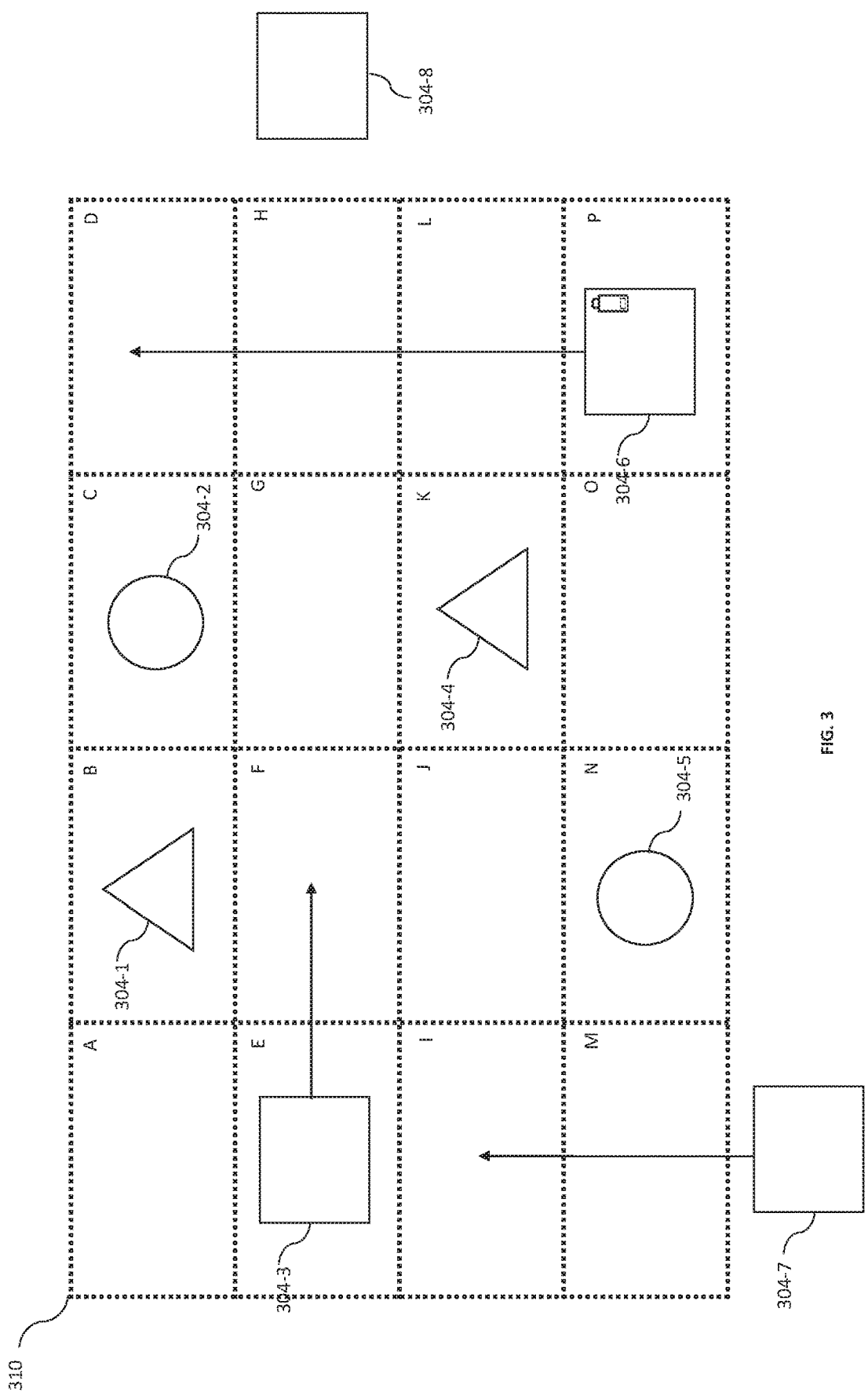
FIG. 3 illustrates client devices present in and/or near an area during a second time interval consistent with the disclosure.

FIG. 3 illustrates client devices 304-1, 304-2, 304-3, 304-4, 304-5, 304-6, 304-7, and 304-8 (collectively referred to as client devices 304) present in and/or near an area 310 during a second time interval. The area 310 may be analogous to the area 210 described in connection with FIG. 2, and the second time interval may be subsequent to the first time interval. For example, the client devices 304 may be present in and/or near the area 310 a week after a time when the client devices 203 were present in and/or near the area 210.

The second time interval (e.g., during which the client devices 304 are associated with the group of APs) may be representative of the first time interval (e.g., during which the client devices 204 are associated with the group of APs) such that the client information of the client devices 204 may be used to predict a degree of performance the group of APs is to provide to the client devices 304. For example, if the first time interval is a 1-hour period (e.g., 9 am to 10 am) on first Monday, the second time interval can be a same 1-hour (e.g., 9 am to 10 am) period on second Monday following the first Monday.

A degree of performance the group of AP is to provide to client devices 304 during the second time interval can be predicted based on a power model. As described herein, the power model is previously determined based on client information of the client devices 204 that were previously associated with the group of APs during the first time interval. Based on the power model, for example, an amount of a load of client devices during a time interval at a location (e.g., sub-area) and a degree of performance the group of AP is to provide to each of the quantity of client devices may be predicted. An amount of a load of client devices can include a quantity of client devices and/or a volume of traffic offered to the client devices associated during the time interval at the location. Based on the prediction, a power state of each AP of the group of APs can be dynamically adjusted to provide a network connectivity to each of the client devices 304 located in various sub-areas of the area 310.

Initially, the client devices 304 may be located in various sub-areas and some of the sub-areas may be left as not being occupied by the client devices 304. For example, there are no client devices 304 located in the sub-areas A, D, F, G, H, I, J, L, M, and O, as shown in FIG. 3. Therefore, these sub-areas having no client device located therein may be free of providing network connectivity; and hence, be free of a demanding degree of performance. As used herein, a demanding degree of performance refers to a degree of network connectivity that a client device demands. For example, the demanding degree of performance can represent a degree of performance that is sufficient to perform a network application properly by the client device (e.g., without experiencing undesired latencies). Accordingly, as long as the client devices 304 are predicted to stay in a same location as shown in FIG. 3, a subset of the group of APs that is, for example, in charge of providing network connectivity to the sub-areas B, C, E, K, N, and P (e.g., where the client devices 304 are respectively located) may be placed in an active state. As an example, during the second interval and based on the prediction, a subset of the group of APs can be selectively adjusted to an active state (e.g., powered on) to serve the client devices 304, while remaining APs of the group of APs can be selectively adjusted to a reduced power state (e.g., powered off), which can provide benefits such as avoiding unnecessary power consumption of the group of APs.

A respective degree of performance being provided to each client device of the client devices 304 may be maintained above a performance threshold, which may be predetermined, for example, based on the client information of the client devices 204. As described herein, the performance threshold may be further adjusted based on the client information and/or a demanding degree of performance of the client devices 304.

During the second time interval, a number of events that would change a demanding degree of performance from each sub-area may occur. For example, during the second time interval, the client device 304-3 moves from a sub-area E to F during the second time interval, the client device 304-6 moves from a sub-area P to a sub-area D, and the client device 304-7 that was located outside of the area 310 moves into the sub-area I, as illustrated in FIG. 3. For example, the client devices 304 may (e.g., even without moving to a different sub-area) demand a more or less capacity. Accordingly, a new demanding degree of performance may be predicted based on the power model and/or dynamically determined based on real-time interaction with the client devices 304.

To predict a new demanding degree of performance, the power model previously determined based on the client information of the client devices 204 may be used to predict a pattern to be shown by the client devices 304. Although examples are not so limited, a pattern that can be predicted consistent with the disclosure can include a mobility pattern (along with a mobility state) and/or a client power switching pattern (along with a network power state). The predicted patterns can be again used to predict the new demanding degree of performance.

The network power state and/or switching pattern of a client device of the client devices 304 can be predicted based on a client power switching pattern and/or a network power state shown by a client device of the client devices 204 having a same client device characteristic as that of a client device of the client devices 304. For example, it may be determined and/or observed that a client device of client devices 204 having an operating system may switch from 2×2 to 1×1 when a power state of the client device falls below a threshold. Assuming that the operating system also runs on the client device 304-6, it may be observed that a power state of the client device 304-6 has not much margin until the threshold, and predicted that the client device 304-6, at some point during the second time interval, may switch from 2×2 to 1×1, which can decrease a demanding degree of performance of the client device 304-6.

The mobility pattern and/or state of each of the client devices 304 can be predicted based on a mobility pattern and/or a mobility state shown by a client device of the client devices 204 having a same client device characteristic as that of each of the client devices 304. For example, since it was determined and/or observed that the client devices 204-1, 204-3, and 204-4 were immobile during the first time interval, and it may be predicted that the client devices 304-1, 304-2, 304-4, and 304-5 (e.g., having a same device characteristic as the client devices 204-1, 204-3, and 204-4) are to be immobile during the second time interval. As another example, since it was determined and/or observed that the client devices 204-2, 204-5, and 204-6 were mobile during the first time interval, it may be predicted that the client devices 304-3, 304-6, 304-7, and 304-8 (e.g., having a same device characteristic as the client devices 204-2, 204-5, and 204-6) are to be mobile during the second time interval. Similarly, a mobility pattern of each of the client devices 304-3, 304-6, 304-7, and 304-8 during the second time interval may also be predicted based on the power model including client information of client devices (e.g., client devices 204-1, 204-3, and 204-4) including previously associated with the group of APs and having the same device characteristics.

As a demanding degree of performance of a client device (e.g., client devices 304) dynamically changes during the second time interval, the demanding degree of performance may be continuously compared to a performance threshold. When the demanding degree of performance is less than the performance threshold, a power state of the group of APs adjusted as predicted may stay the same and/or may be further adjusted to reduce a degree of performance being provided to the client devices such that a power consumption of the group of APs can be reduced. When the demanding degree of performance becomes greater than the performance threshold, the performance threshold can be further adjusted (e.g., more APs can be adjusted to an active state) to meet the demanding degree of performance; and hence, a power state of the group of APs can be further adjusted based on the adjusted performance threshold.

At the end of the second time interval and/or at a later time subsequent to the second time interval, the power model previously determined based on the second client devices 204 may be further modified based on the client information of the client devices 304 obtained and determined during the second time interval. Therefore, the power model that is being dynamically adjusted based on client information of recent client devices may provide benefits such as reflecting a trend of client devices recently associated with the group of APs, which can predict a degree of performance the group of APs is to provide to future client devices more precisely.

Figure 4:
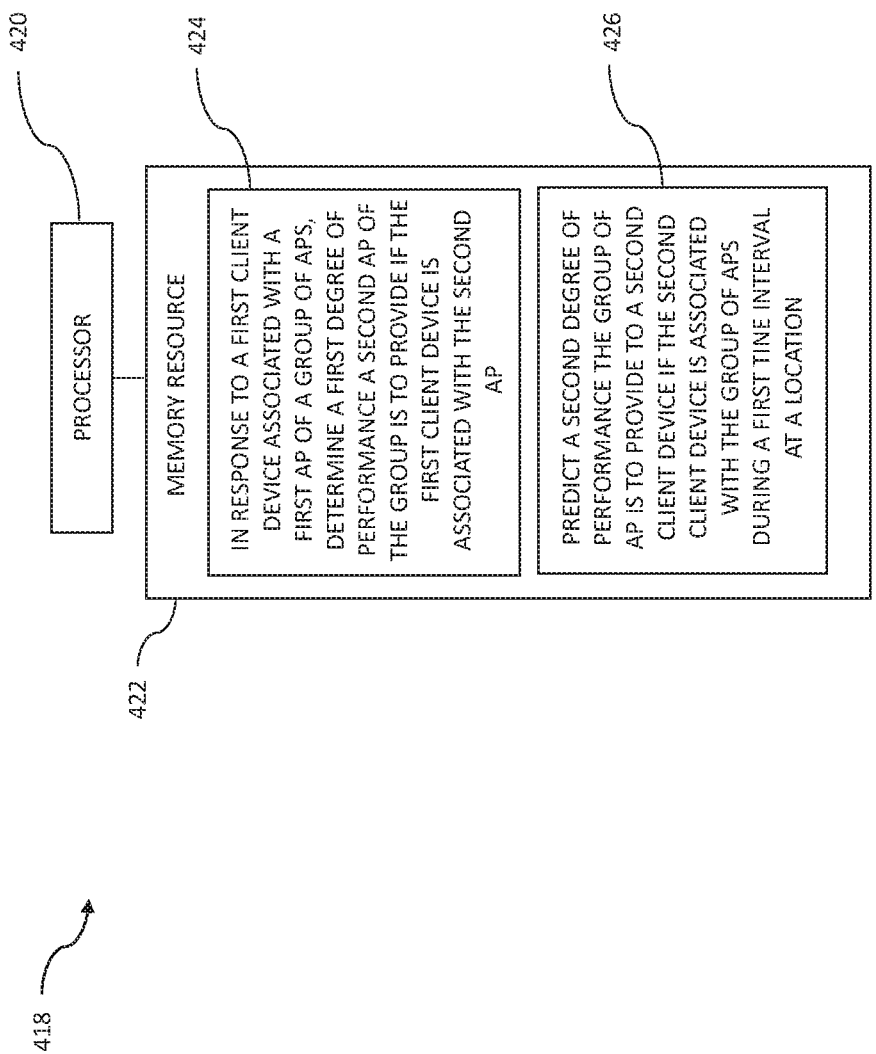
FIG. 4 is a block diagram of an example system consistent with the disclosure.

FIG. 4 is a block diagram of an example system 418 consistent with the disclosure. In the example of FIG. 4, system 418 includes a processor 420 and a machine-readable storage medium 422. Although the following descriptions refer to an individual processor and an individual machine-readable storage medium, the descriptions may also apply to a system with multiple processors and multiple machine-readable storage mediums. The instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 420 may be a central processing unit (CPU), microprocessor, and/or other hardware device suitable for retrieval and execution of instructions stored in machine-readable storage medium 422. In the particular example shown in FIG. 4, processor 420 may receive, determine, and send instructions 424 and 426. As an alternative or in addition to retrieving and executing instructions, processor 420 may include an electronic circuit comprising electronic components for performing the operations of the instructions in machine-readable storage medium 422. With respect to the executable instruction representations or boxes described and shown herein, it should be understood that part or all of the executable instructions and/or electronic circuits included within one box may be included in a different box shown in the figures or in a different box not shown.

Machine-readable storage medium 422 may be any electronic, magnetic, optical, or other physical storage device that stores executable instructions. Thus, machine-readable storage medium 422 may be, for example, Random Access Memory (RAM), an Electrically-Erasable Programmable Read-Only Memory (EEPROM), a storage drive, an optical disc, and the like. The executable instructions may be "installed" on the system 534 illustrated in FIG. 4. Machine-readable storage medium 422 may be a portable, external or remote storage medium, for example, that allows the system 418 to download the instructions from the portable/external/remote storage medium. In this situation, the executable instructions may be part of an "installation package". As described herein, machine-readable storage medium 422 may be encoded with executable instructions for adjusting power states of access points based on a power model.

Determine instruction 424, when executed by a processor such as processor 420, may cause system 418 to determine, in response to a first client device (e.g., client devices 104 as described in connection with FIG. 1) being associated with a first AP of a group of APs (e.g., network devices 102-1 as described in connection with FIG. 1), a first degree of performance a second AP of the group is to provide if the first client device is associated with the second AP.

Determine instruction 426, when executed by a processor such as processor 420, may cause system 418 to predict, based on the determined power model, a second degree of performance the group of APs is to provide to a second client device if the second client device is associated with the group of APs during a first time interval at a location. Stated differently, the second degree of performance the group of APs is to provide to the second client device may be determined based on the client information of the first client device.

In an example where the first client device is one client device of a plurality of client devices, the client information may include a quantity of the plurality of client devices that have previously associated with the group of APs during the second time interval, a respective client power switching pattern, a respective network frequency band capability, a respective total number of transceivers, a respective operating system, and/or a respective WLAN specification of each of the plurality of client devices, although examples are not so limited. Stated differently, the power model may predict a quantity of client devices, a respective client power switching pattern, a respective network frequency band capability, a respective total number of transceivers, a respective operating system, and/or a respective WLAN specification of each of the client devices that are to associate with the group of APs during the first time interval.

Figure 5:
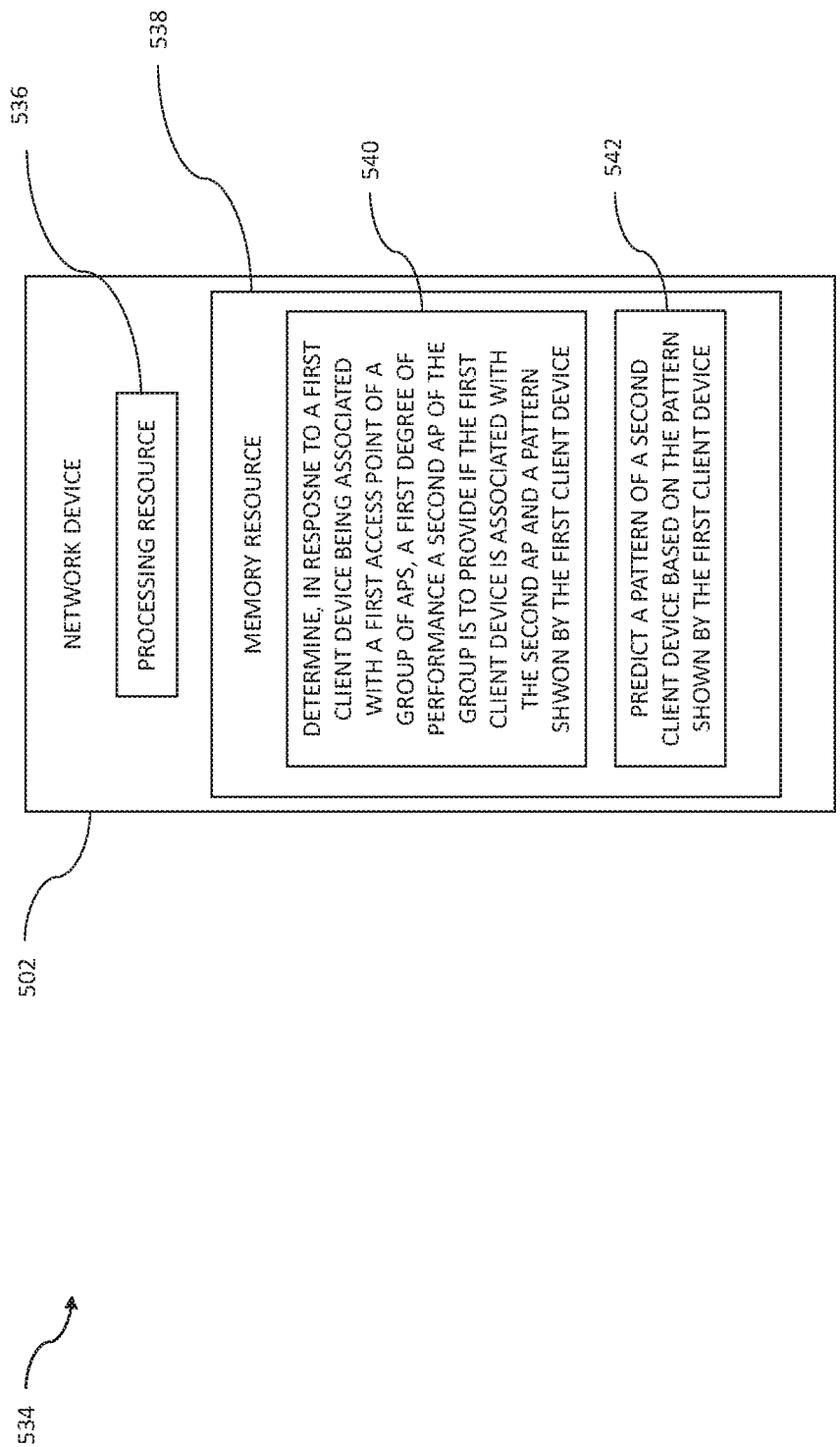
FIG. 5 is a block diagram of an example network device consistent with the disclosure.

FIG. 5 is a block diagram 534 of an example network device 502 consistent with the disclosure. As described herein, the network device 502 may perform a number of functions related to adjusting power states of access points based on a power model. Although not illustrated in FIG. 5, the network device 502 may include a processor and a machine-readable storage medium. Although the following descriptions refer to an individual processor and an individual machine-readable storage medium, the descriptions may also apply to a system with multiple processors and multiple machine-readable storage mediums. In such examples, the network device 502 may be distributed across multiple machine-readable storage mediums and the network device 502 may be distributed across multiple processors. Put another way, the instructions executed by the network device 502 may be stored across multiple machine-readable storage mediums and executed across multiple processors, such as in a distributed or virtual computing environment.

As illustrated in FIG. 5, the network device 502 may comprise a processing resource 536, and a memory resource 538 storing machine-readable instructions to cause the processing resource 536 to perform a number of operations relating to adjusting power states of access points based on a power model. Processing resource 536 may be a central processing unit (CPU), microprocessor, and/or other hardware device suitable for retrieval and execution of instructions stored in memory resource 538.

The network device 502 may include instructions 540 stored in the memory resource 538 and executable by the processing resource 536 to determine (when a first client device is associated with a first AP of a group of APs) a first degree of performance a second AP of the group is to provide if the first client device is associated with the second AP and a pattern shown by the first client device.

The network device 502 may include instructions 542 stored in the memory resource 538 and executable by the processing resource 536 to predict (when a second client device is associated with an AP of the group of APs) a pattern of the second client device based on the pattern shown by the first client device. In some examples, the pattern of the second client devices may be predicted based on a pattern shown by a client device (e.g., of the first plurality of client devices) having a same client device type as that of the second client device. The pattern may include a mobility pattern and/or a client power switching pattern, although examples are not so limited.

Figure 6:
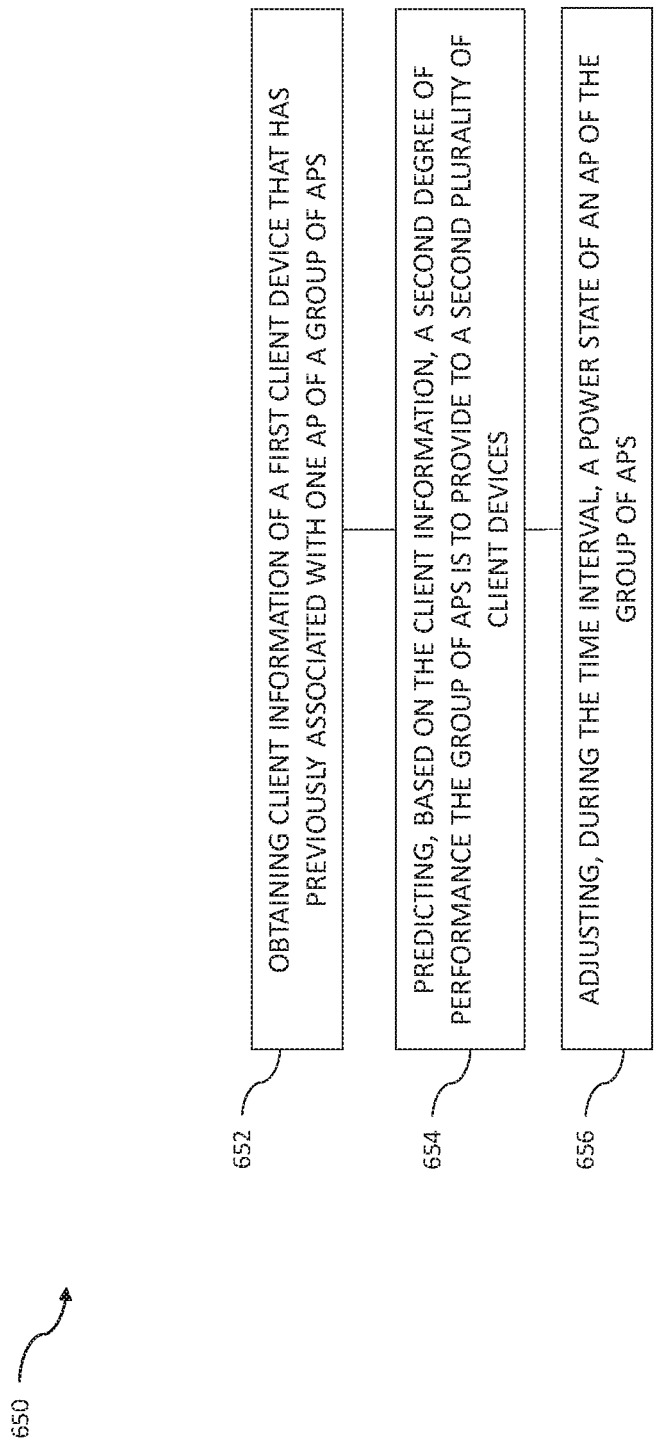
FIG. 6 illustrates an example method consistent with the disclosure.

FIG. 6 illustrates an example method 650 consistent with the disclosure. Method 650 may be performed, for example, by a network device (e.g., network devices 102, previously described in connection with FIG. 1). At 652, the method 650 includes obtaining client information of a first client device that has previously associated with one AP of a group of APs. In some examples, the client information includes a first degree of performance a first AP of the group of APs is to provide to the first client device if the first client device is associated with the first AP of the group of APs. At 654, the method 650 includes predicting, based on the client information, a second degree of performance the group of APs is to provide to a second plurality of client devices if each of the second plurality of client devices are associated with a respective AP of the group of APs during a time interval and at a respective location.

At 656, the method 650 includes adjusting, during the time interval, a power state of an AP of the group of APs. The AP (e.g., group of APs) with the adjusted power state provides, to the second plurality of client devices, the second degree of performance as predicted by a power model previously determined. In some examples, the second degree of performance being provided to the second plurality of client devices may be decreased and/or increased beyond the prediction suggested by the power model. For example, if the second degree of performance is greater than a demanding degree of performance by a threshold amount (e.g., less client devices are present than predicted), the second degree of performance may be reduced by further adjusting power states of the group of APs (e.g., putting more APs into a reduced power stated). For example, if the second degree of performance is less than a demanding degree of performance by a threshold amount (e.g., more client devices are present than predicted), the second degree of performance may be increased by further adjusting power states of the group of APs (e.g., putting more APs into an active state).

In some examples, a number of aspects of the second plurality of client devices may be predicted. For example, a quantity of client devices (e.g., a quantity of the second plurality of client devices) to be associated with a respective one of the group of APs during the time interval and at the respective location may be predicted. Based on the prediction, as described herein, a subset of the group of APs that is to serve the second plurality of client devices and when to adjust each AP of the subset (e.g., to provide a sufficient degree of performance to each of the second plurality of client devices) can be determined as well.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

The term "coupled" means directly or indirectly connected. Unless stated otherwise, the term "coupled" can include a wireless connection.

What is claimed:

1. A non-transitory computer readable medium storing instructions executable by a processing resource to cause the processing resource to:
   in response to a first client device associating with a first access point (AP) of a group of APs, determine:

a first degree of performance that a second AP of the group is to provide if the first client device is associated with the second AP, wherein the first client device is one of a plurality of client devices that have associated with at least one AP of the group of APs; and a mobility pattern of the first client device during the association with the group of APs;

in response to a second client device associating with the group of APs during a first time interval, predict:

a second degree of performance that an AP of the group of APs is to provide to the second client device, based on the determined first degree of performance; and a mobility pattern of the second client device based on the mobility pattern of the first client device; and individually adjust a power state of each AP of the group of APs based on a comparison of the second degree of performance to a performance threshold and the predicted mobility pattern of the second client device, wherein the predicted mobility pattern of the second client device is indicative of a direction of movement of the second client device between different subareas corresponding to one AP of the group of APs.

2. The medium of claim 1, wherein the medium includes further instructions to predict the second degree of performance based on client information including a respective degree of performance that the one or more APs have provided to each of the plurality of client devices during a second time interval.

3. The medium of claim 2, wherein the instructions to predict are based on client information including a quantity of the plurality of client devices that have previously associated with the one or more APs during the second time interval.

4. The medium of claim 2, wherein the instructions to predict are based on the client information including a respective client power information associated with each of the plurality of client devices.

5. The medium of claim 2, wherein the client information includes a respective network frequency band capability of each of the plurality of client devices.

6. The medium of claim 2, wherein the client information includes a respective total number of transceivers of each of the plurality of client devices.

7. The medium of claim 2, wherein the instructions to predict comprise determining a power model based on client information for each of the plurality of client devices.

8. A network device, comprising:
a processing resource; and
a memory resource including instructions executable by a processing resource to:
in response to a first client device associating with a first access point (AP) of a group of APs, determine:
a first degree of performance that a second AP of the group of APs is to provide if the first client device is associated with the second AP, wherein the first client device is one of a plurality of client devices that have associated with at least one AP of the group of APs; and
a mobility pattern of the first client device during the association with the group of APs;
in response to a second client device associating with the group of APs during a first time interval, predict:
a second degree of performance that an AP of the group of APs is to provide to the second client device, based on the determined first degree of performance; and
a mobility pattern of the second client device based on the mobility pattern of the first client device; and
individually adjust a power state of each AP of the group of APs based on a comparison of the second degree of performance to a performance threshold and the predicted mobility pattern of the second client device, wherein the predicted mobility pattern of the second client device is indicative of a direction of movement of the second client device between different subareas corresponding to one AP of the group of APs.

9. The network device of claim 8, further comprising instructions to:
reassign a client device from a respective AP currently associated with the client device to an AP whose power state is adjusted to an active power state; and
adjust, subsequent to the client device being reassigned, a power state of the AP that the client device was previously associated with to a reduced power state.

10. The network device of claim 8, wherein the mobility pattern of the second client device is predicted based on a mobility pattern of a client device of the plurality of client devices having a same client device type as that of the second client device.

11. The network device of claim 10, wherein the predicted mobility pattern includes a client power switching pattern.

12. A method, comprising:
in response to a first client device associating with a first access point (AP) of a group of APs, obtaining client information of the first client device, wherein the client information comprises:
a first degree of performance that a second AP of the group of APs is to provide to the first client device if the first client device is associated with the second AP, wherein the first client device is one of a plurality of client devices that have associated with at least one AP of the group of APs; and
a mobility pattern of the first client device during the association with the group of APs;
in response to a second client device associating with the group of APs during a first time interval, predicting, based on the client information;
a second degree of performance that an AP of the group of APs is to provide to the second client device, based on the determined first degree of performance; and
a mobility pattern of the second client device based on the mobility pattern of the first client device; and
individually adjusting a power state of each AP of the group of APs based on a comparison of the second degree of performance to a performance threshold and the predicted mobility pattern of the second client device, wherein the predicted mobility pattern of the second client device is indicative of a direction of movement of the second client device between different subareas corresponding to one AP of the group of APs.

13. The method of claim 12, further comprising, in response to the second degree of performance being greater than the performance threshold, reducing the second degree of performance being provided to the second client device by further adjusting power states of the group of APs.

14. The method of claim 12, further comprising, in response to the second degree of performance being less than the performance threshold, increasing the second degree of performance being provided to the second client device by further adjusting power states of the group of APs.

15. The method of claim 12, wherein predicting the second degree of performance comprises predicting an amount of load of client devices to be associated with a respective one of the group of APs during the first time interval.

16. The method of claim 12, further comprising adjusting the power state of each AP of the group of APs comprises:
  determining a subset of the group of APs to serve the plurality of client devices during the time interval; and
  determining when to adjust a power state of a respective AP of the subset of APs to an active state.

17. The method of claim 12, further comprising:
  sending, while a second client device is associated with the second AP of the group of APs, a packet from the first AP to the second client device to estimate the second degree of performance.

18. The method of claim 17, further comprising:
  receiving a signal from the second client device in response to sending the packet;
  determining, based on the received signal, a performance characteristic of the received signal including at least one of a packet latency, a packet drop rate, a data transmission/receipt rate, and a signal-to-noise (SNR); and
  estimating the second degree of performance based on the determined performance characteristic.

19. The medium of claim 1, wherein the adjusting of the power state is further based on a client power switching pattern, wherein the client power switching pattern comprises a bandwidth utilization and a power consumption pattern of the second client device.

20. The medium of claim 1, wherein the adjusting of the power state is further based on a packet patency, a packet retry or drop rate, a data transmission or receipt rate, a signal-to-noise (SNR) ratio, and channel state information between the AP and the second client device.

* * * * *